Jan. 9, 1940.   V. A. BOKER   2,186,799
METHOD OF PRODUCING DIE SETS
Filed Feb. 2, 1938    11 Sheets-Sheet 1
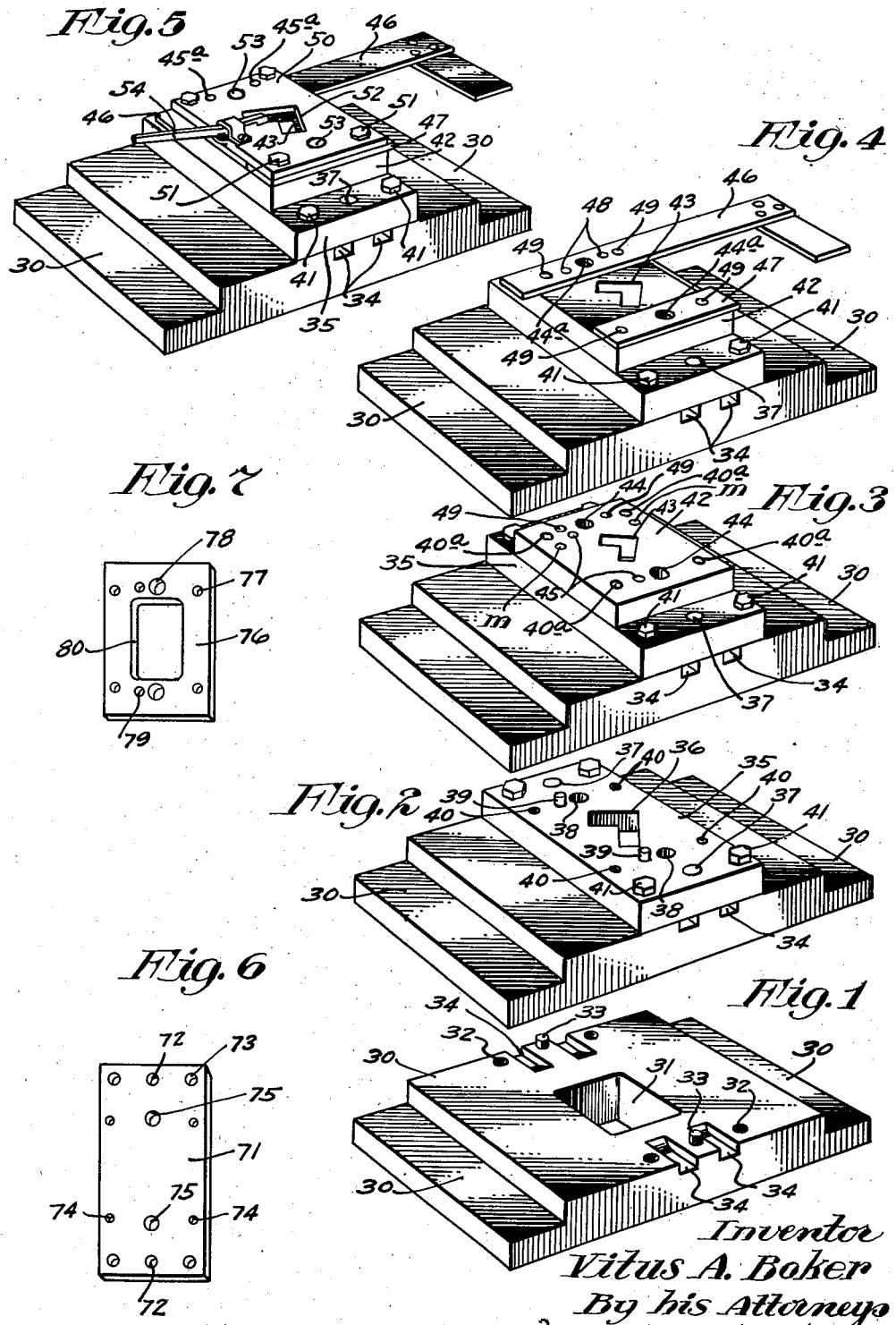
Inventor
Vitus A. Boker
By his Attorneys
Michael & Michael

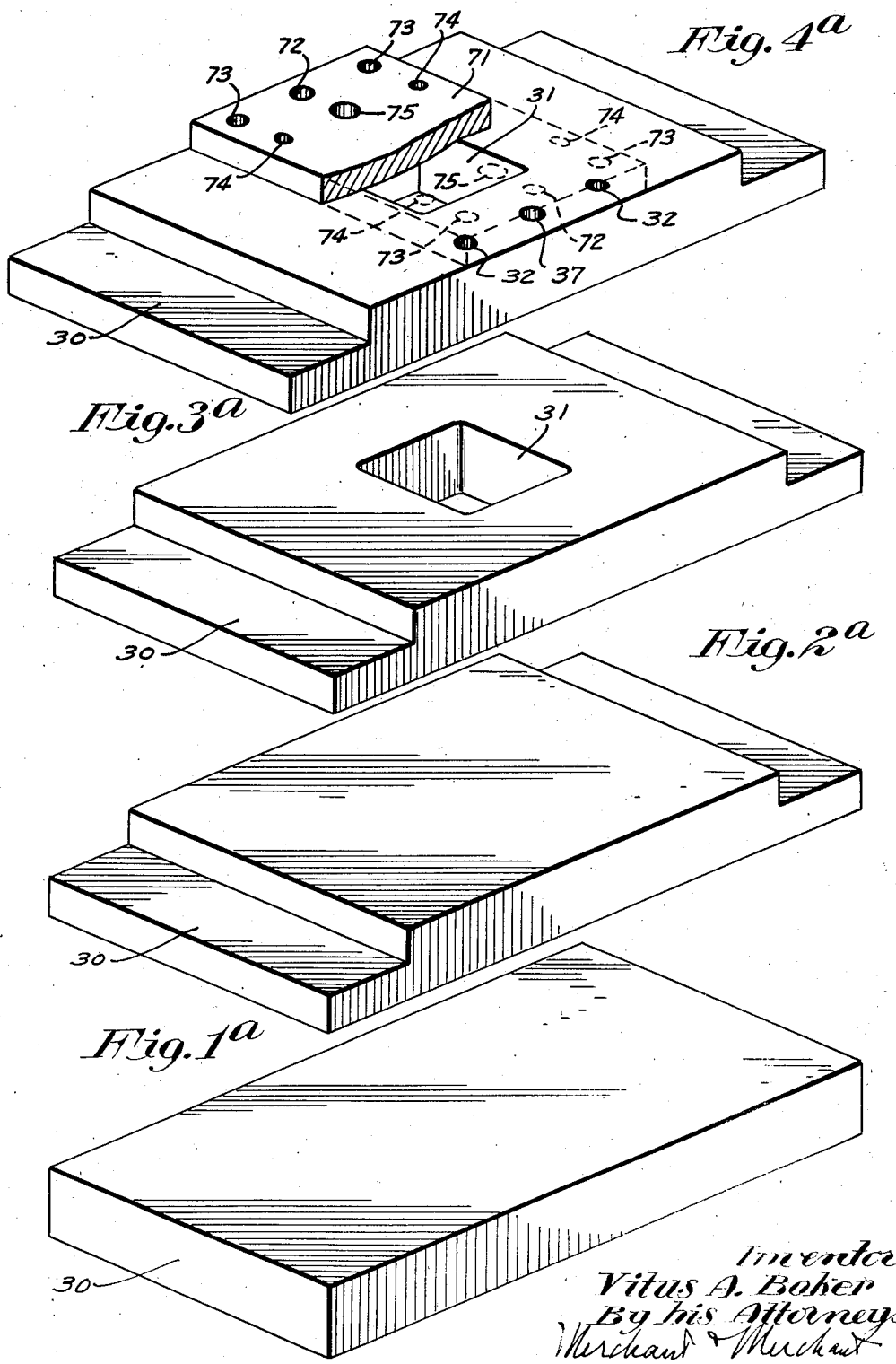

Jan. 9, 1940.   V. A. BOKER   2,186,799
METHOD OF PRODUCING DIE SETS
Filed Feb. 2, 1938   11 Sheets-Sheet 3
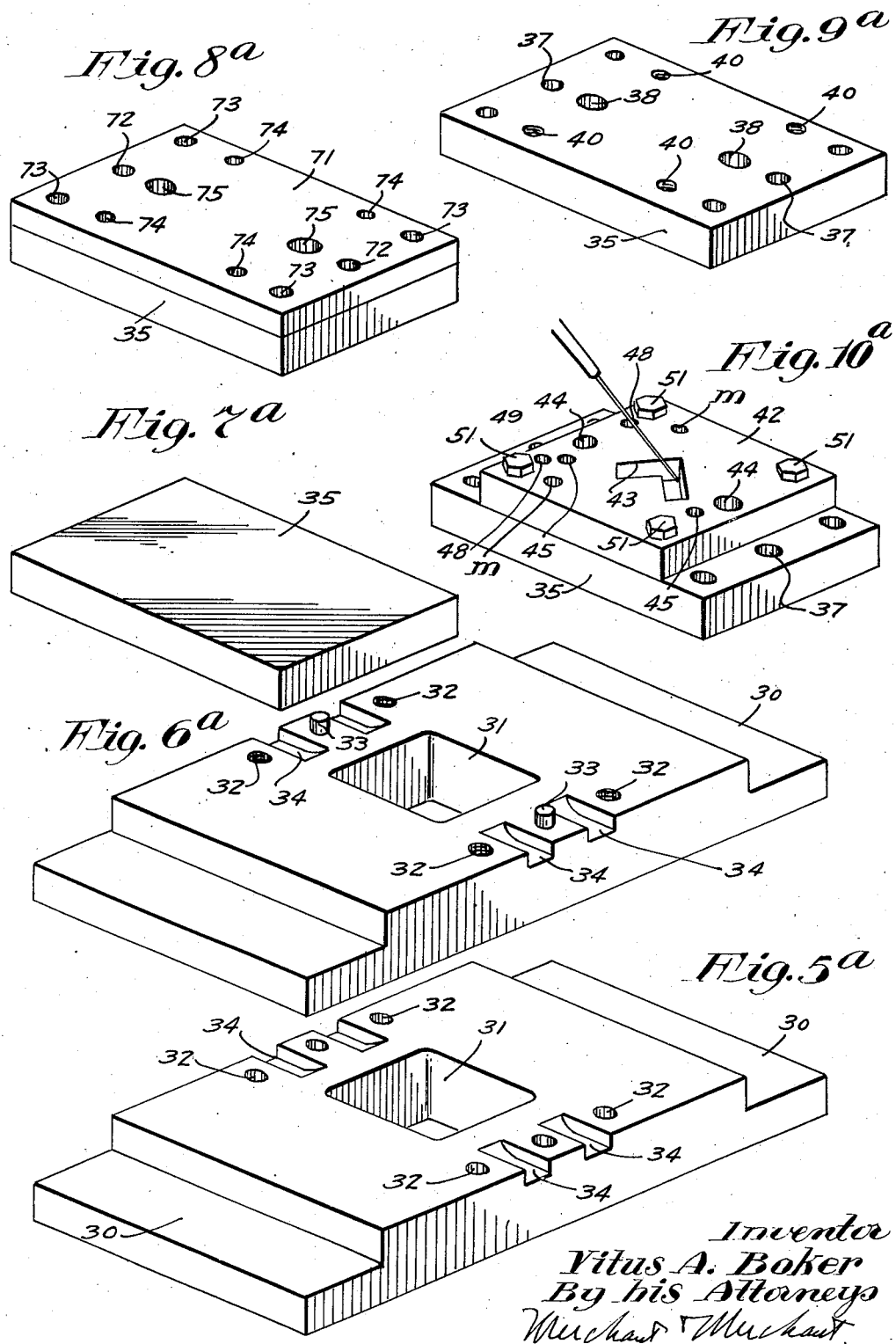
Inventor
Vitus A. Boker
By his Attorneys

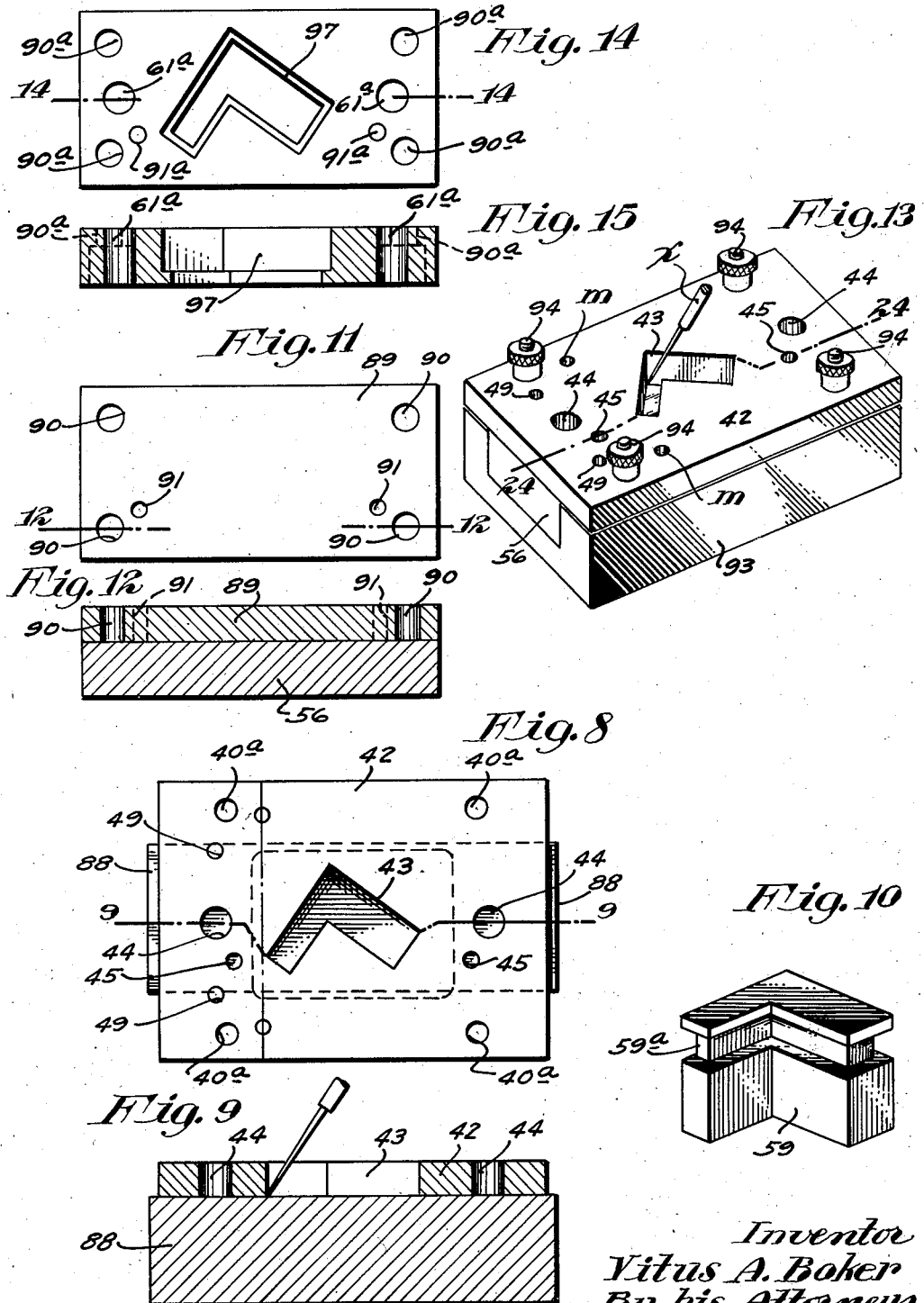

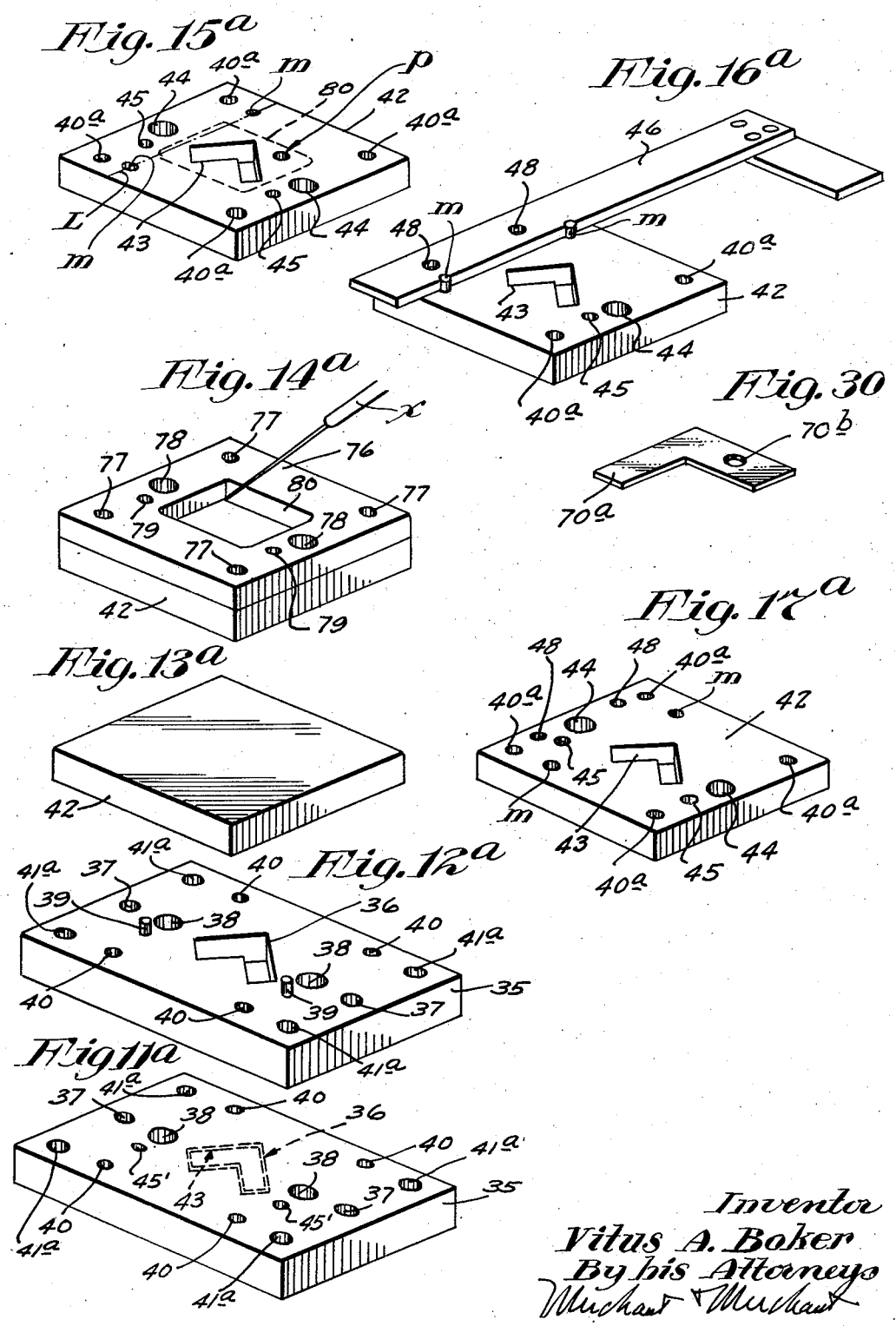

Jan. 9, 1940.  V. A. BOKER  2,186,799
METHOD OF PRODUCING DIE SETS
Filed Feb. 2, 1938   11 Sheets-Sheet 6
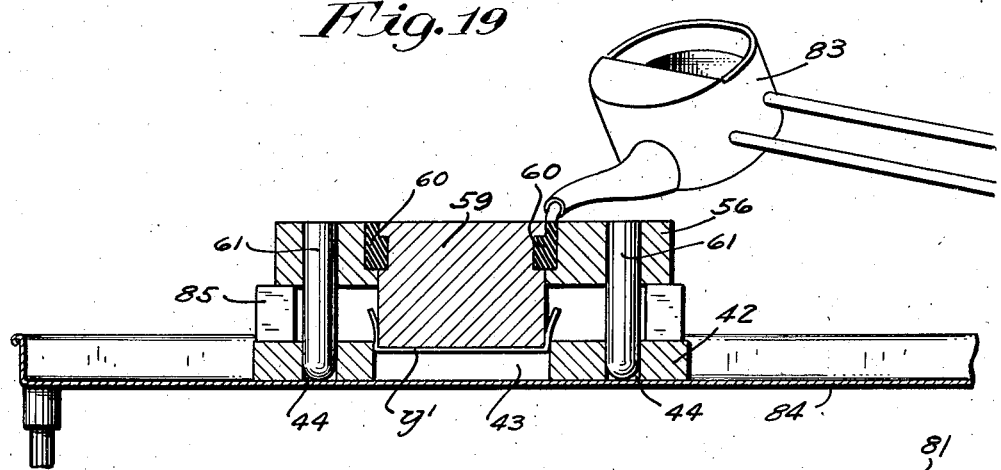
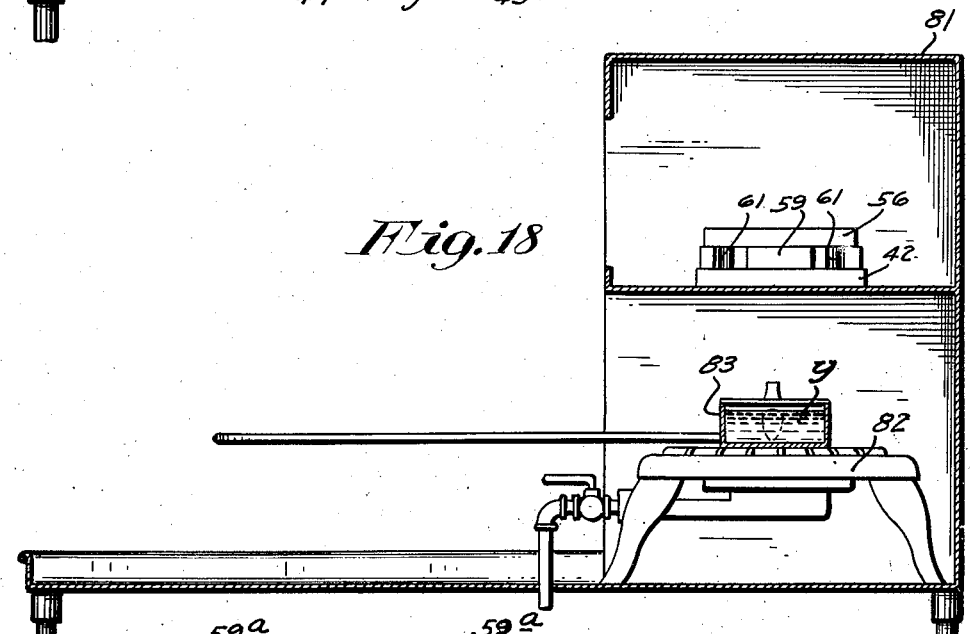
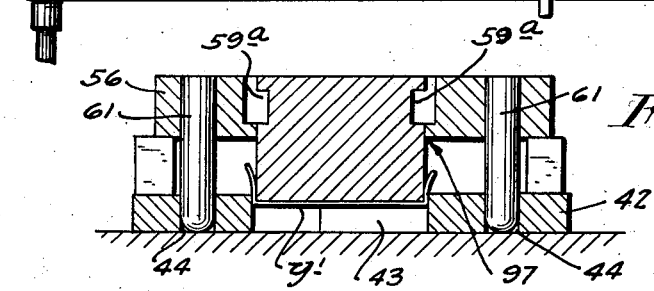
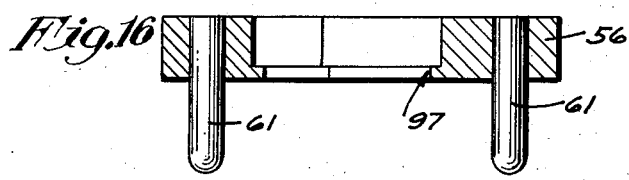
Inventor
Vitus A. Boker
By his Attorneys Jan. 9, 1940.   V. A. BOKER   2,186,799
METHOD OF PRODUCING DIE SETS
Filed Feb. 2, 1938    11 Sheets-Sheet 7
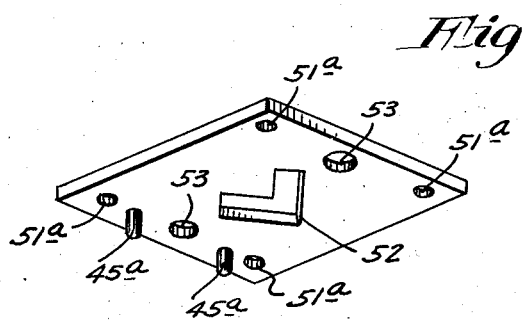
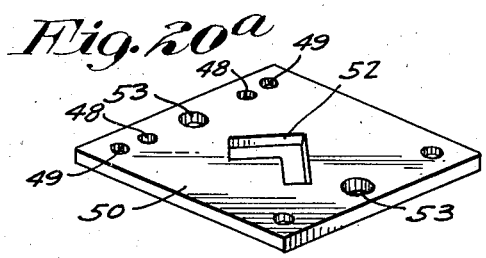
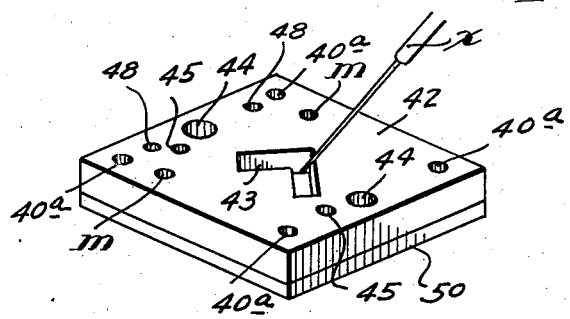
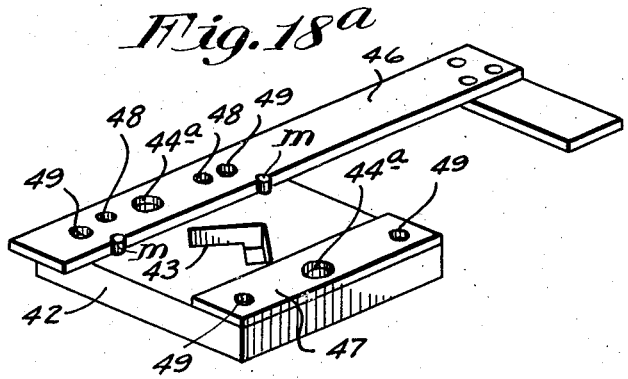
Inventor
Vitus A. Boker
By his Attorneys Jan. 9, 1940. V. A. BOKER 2,186,799
METHOD OF PRODUCING DIE SETS
Filed Feb. 2, 1938 11 Sheets-Sheet 8
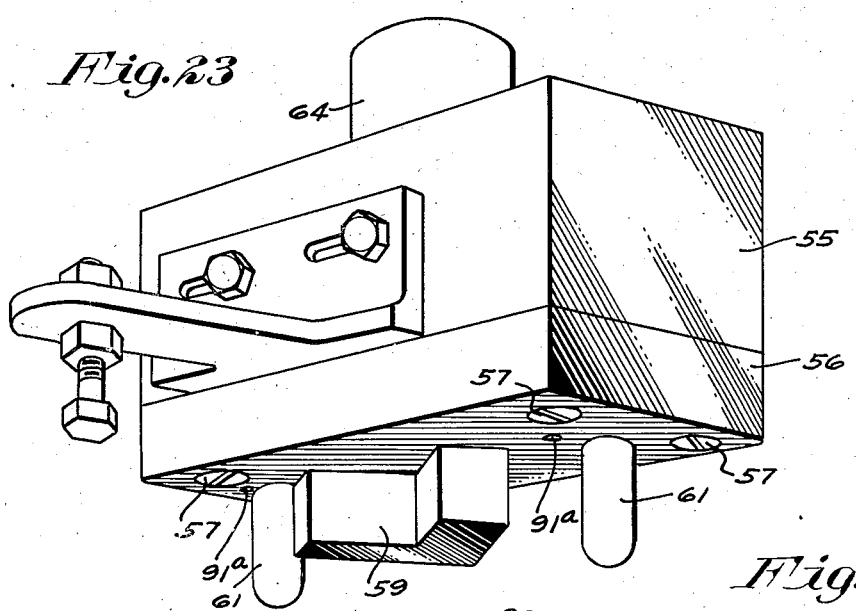
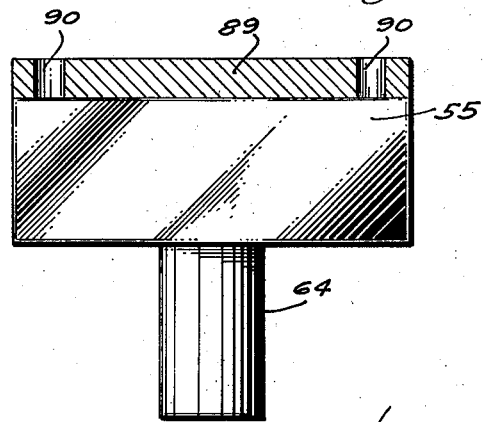
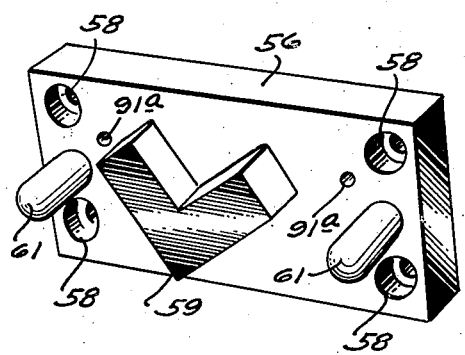
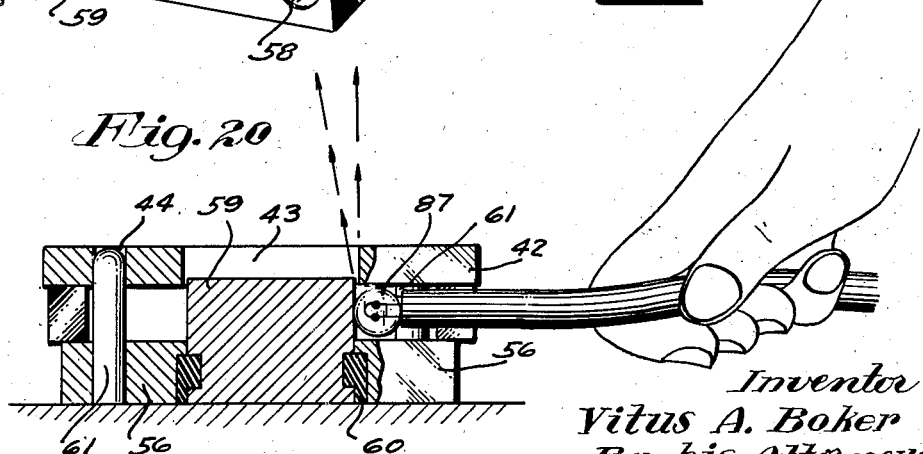
Inventor
Vitus A. Boker
By his Attorneys Jan. 9, 1940.　　　　V. A. BOKER　　　　2,186,799
METHOD OF PRODUCING DIE SETS
Filed Feb. 2, 1938　　　11 Sheets-Sheet 9
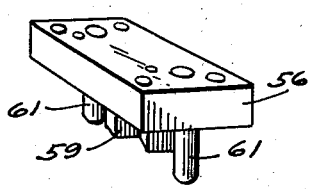
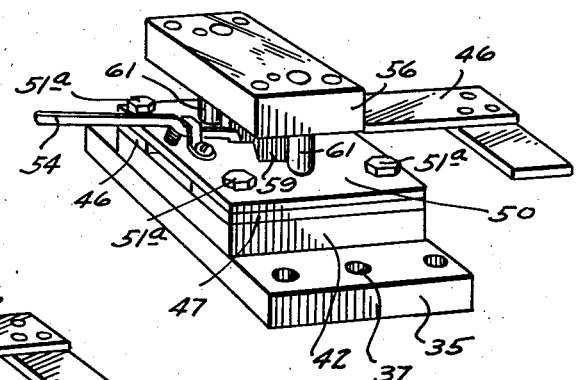
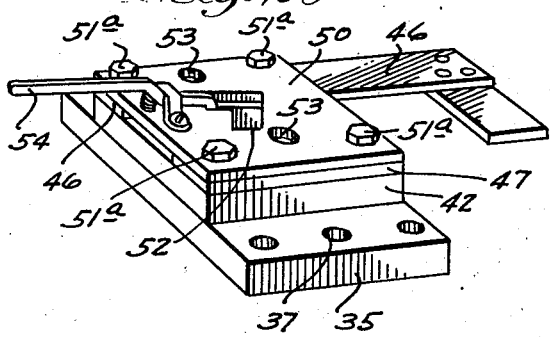
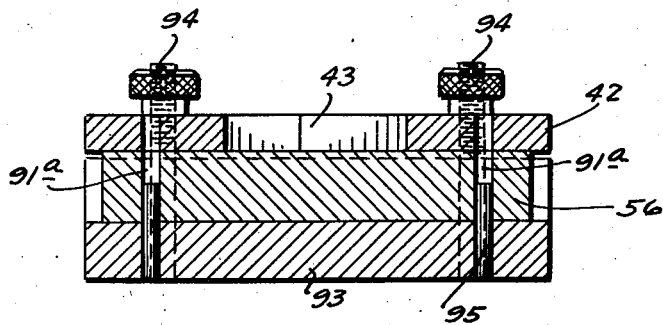
Inventor
Vitus A. Boker
By his Attorneys

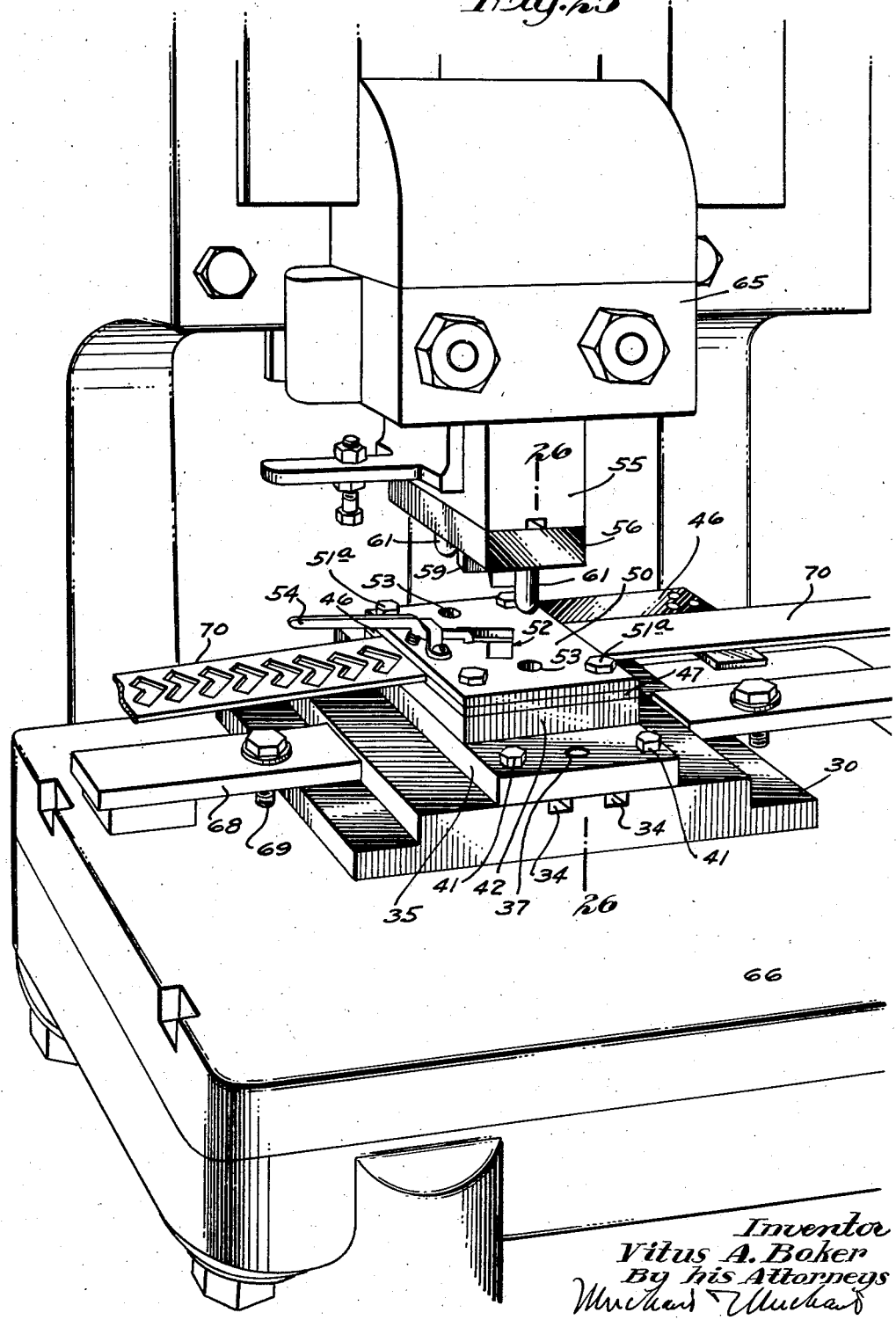

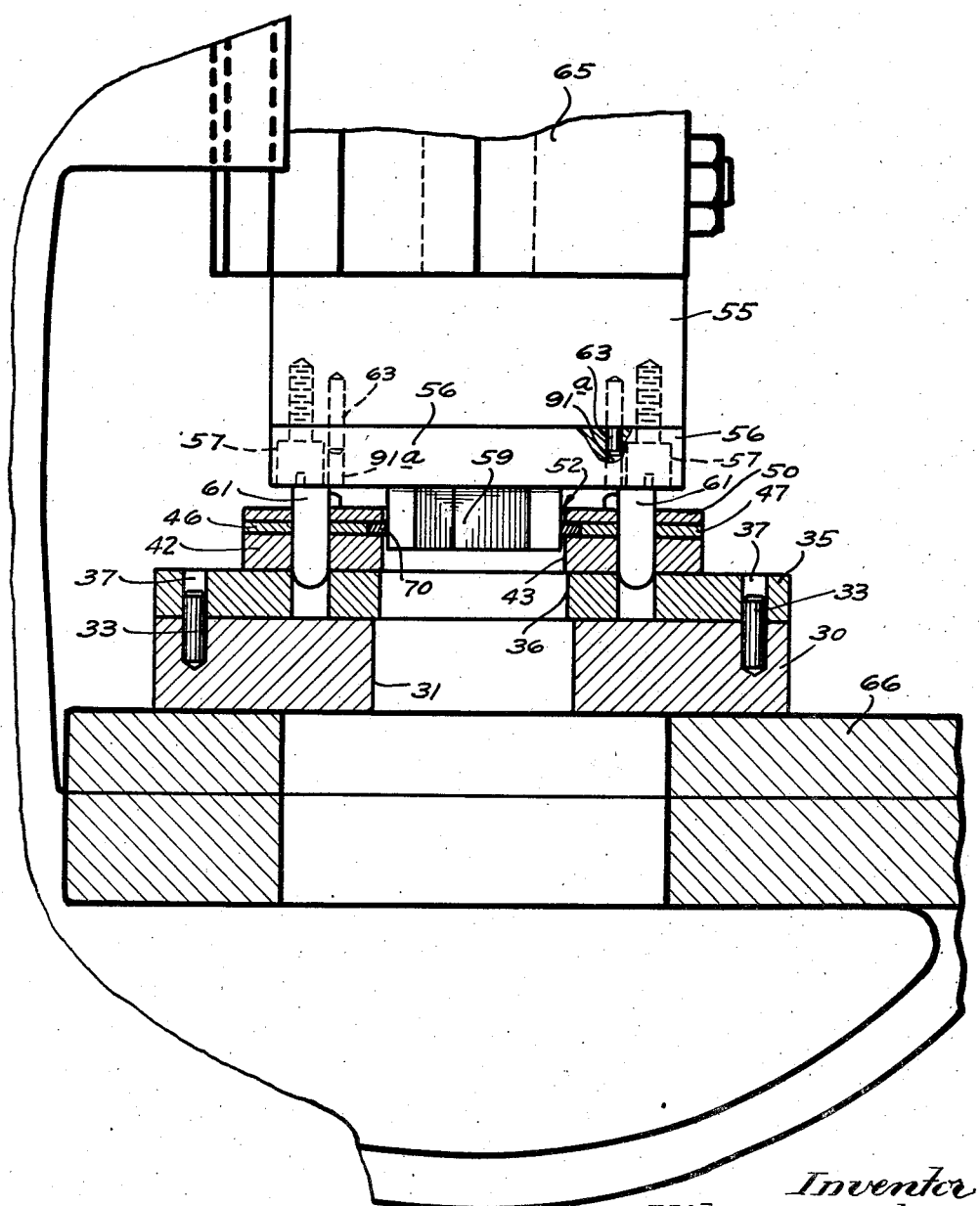

Patented Jan. 9, 1940

2,186,799

UNITED STATES PATENT OFFICE 2,186,799

METHOD OF PRODUCING DIE SETS

Vitus A. Boker, Minneapolis, Minn.

Application February 2, 1938, Serial No. 188,313

4 Claims. (Cl. 76—107)

My present invention involves a new method or process of producing and using dies for the production of stampings from sheet or strip metal as well as other sheet or strip material that is sufficiently plastic to be worked in presses by dies and punches.

The invention herein disclosed also involves an improved die set or apparatus which, however, will be claimed in a separate application.

The conventional or old method used a complete die set for each die. Also in this old method it was the practice to place the alignment pins in the shoe or lower member of the die set, and the punch holder or upper member of the die set having guides through which these pins were passing. This location of the alignment pins and their guides outward and outside of the die is, in my improved method, eliminated and made unnecessary with highly improved results, by the use of the die, after hardening, as a drill jig for locating the alignment pins in the punch pad or punch head.

By my improved method, dies can be standardized and all parts can be jig drilled. All dies, within a certain range, can be used in one die set. This improved die set includes a shoe and a punch pad holder. Preferably, the shoes are made from precision cold rolled steel, but may be otherwise produced. In the preferred embodiment of the invention the die support is preferably cut to length from precision cold rolled steel of the proper width and thickness. It is then jig drilled, holes are drilled for anchor screws by which it is secured to the shoe, to receive the dowels in the shoe, and for the passage of alignment pins and the like.

The steel for the die is cut to length from bar stock of the proper width and of sufficient thickness to allow for the removal of the decarbonized surface; and the jig noted is then placed on the die blank and the two are clampd together. The large rectangular hole in the jig is now marked off and the die indicating the available space for die openings; and before the jig is removed from the die blank holes are drilled for anchor screws by which die is secured to die support, for alignment pins and for dowel pins by which it is doweled to the die support.

The drill jig is now removed, the apertures for the punches are laid off on the die blank and put in, in the usual manner. It is now heat-treated, which consists of hardening and tempering. This heat-treating process causes a slight shrinkage of the die and for this and other reasons, it has heretofore been thought necessary to arrange punch and die alignment outside of the die itself; this alignment process was usually accomplished by drilling two holes in the shoe of the die set and insert two posts, sometimes called leader pins. The punch holder of the die set has two holes drilled in it which correspond to the posts and is a sliding fit over the posts. By this method of alignment it is necessary to permanently mount each die on a die set. It is obvious that alignment made in this manner is a considerable distance outside and above the working zone of the die. The give or spring of the press and play or slight looseness in the gibs, under punching pressure, may cause disalignment and shearing of the press tools.

An important feature of the improved method is accomplished by boring the alignment pin holes directly in the die hardening it and using it as a drill jig for locating and boring the alignment holes or seats in the punch pad for the alignment pins.

The above briefly noted and other features of the improved method will more fully appear in the description of the accompanying drawings wherein like characters indicate like parts throughout the several views.

Referring to the drawings:

Fig. 1 is a perspective showing the shoe of the die set;

Fig. 2 is a perspective showing the shoe with the die support applied thereto;

Fig. 3 is a perspective showing the shoe with the die support applied thereto and with the die applied to the die support;

Fig. 4 is a perspective of the parts shown in Fig. 3 with the aligning strips or stock spacers applied to the die;

Fig. 5 is a view of the parts shown in Fig. 4, with the stripper plate applied on the aligning strips and showing also a stock stop applied to the stripper plate;

Fig. 6 is a perspective showing the jig used for locating and boring of the holes in the shoe and die support;

Fig. 7 is a perspective showing a jig for use in scribing off available space in which to lay off openings in the die for punches to pass through and also locating and boring the round holes in the die before it is hardened;

Fig. 8 is a plan view showing the hardened die placed upon or clamped to the punch blank, the outline of which is marked off through the die;

Fig. 9 is a section taken on the line 9—9 of Fig. 8;

Fig. 10 is a perspective showing the punch formed from the blank of Figs. 8 and 9;

Fig. 11 is a plan view of a jig made use of in drilling six holes in the punch pad;

Fig. 12 is a section taken on the line 12—12 of Fig. 11;

Fig. 13 is a perspective showing a box jig to be used for drilling the two alignment pin holes in the punch pad. The punch pad is placed in this jig, located by the two dowel pins, and the hardened die is now placed on the jig, and by means of the four studs is clamped on the punch pad in a fixed relation to the opening for the punch, and the alignment pin holes, which are now drilled through the die, using it as a jig, and the aperture for the punch is now scribed or marked off through the die opening;

Fig. 14 is a plan view of the completed punch pad;

Fig. 15 is a section approximately on the line 14—14 of Fig. 14;

Fig. 16 is a vertical longitudinal section showing the complete punch pad with the alignment pins forced into position;

Fig. 17 is a vertical longitudinal section showing the die, the punch, and the punch pad assembled for alignment in preparation for the pouring of the matrix material into the recess between the punch and punch pad;

Fig. 18 is a vertical section illustrating one of the steps of the preferred process and showing an oven in which the parts shown in Fig. 17 are placed to be heated to facilitate the flow of matrix material that a perfect joint may be obtained;

Fig. 19 is a vertical section illustrating the pouring of the matrix material into the recess between the punch and the punch pad;

Fig. 20 is a view, in inverted position, the punch pad, the punch, and the die assembled for inspection of proper clearances;

Fig. 21 is a perspective showing the punch pad, with the punch and aligning pins assembled and forming practically an integral structure;

Fig. 22 shows the punch head in inverted position and with the jig of Fig. 11 placed upon the planed face thereof, for locating and drilling of the four anchor screw holes, and the two dowel pin holes;

Fig. 23 is a perspective showing the assembled punch head, punch pad, punch, and aligning pins;

Fig. 24 is a section taken approximately on the line 24—24 of Fig. 13;

Fig. 25 is a perspective illustrating a punch press with the improved die set in position in the press, and indicating it in operation on a strip of material;

Fig. 26 is a fragmentary view with some parts in full but with some parts sectioned approximately on the line 26—26 of Fig. 25;

Fig. 27 is a perspective showing what may be designated as the upper die member;

Fig. 28 is a perspective showing what may be called the lower die member;

Fig. 29 is a perspective showing the upper and lower die members assembled and constituting what may be designated as the die unit; and Figs. 1a to 21a, inclusive, are perspective views illustrating the steps employed in the preferred manner of carrying out the improved method or process of producing the lower die member of the complete die set.

*Structure of the set*

Before tracing the steps of the process, the structure in its preferred design or embodiment will be described. In this description it is assumed that the set has been built from the bottom up. In other words the shoe was made first, then the die support after that the die, and so on. Attention is first called particularly to Figs. 1 to 5, inclusive. The shoe of the die set is indicated by the numeral 30. This shoe is formed with a large rectangular central opening or working zone 31 and with tapped screw holes 32, with dowel pins 33, and with pry grooves 34. The holes 32, subsequent to boring, are tapped or screw-threaded, see Fig. 1.

Referring now particularly to Fig. 2, it will be noted that the die support 35, which is a flat steel plate, is formed with a slug passage 36, with holes 37 to receive the dowel pins 33 of the shoe, with alignment pin clearance passage 38, with dowel pins 39, and with tapped screw holes 40. The die support is rigidly but detachably secured to the shoe by cap screws 41 passed through corner holes 41a in the die support and screwed into the tapped holes 32 of the shoe. It is now important to state that the slug passage 36 is seated over the central opening or working zone 31 of the shoe and it may be here stated that the slug passage 36 is slightly larger, usually about a thirty-second of an inch, than the die opening of the die plate, presently to be described.

The die 42 is a rectangular plate formed with a die opening 43 that overlies the slug clearance passage 36 of the die support 35. This die 42 has two round holes or passages 44 which are so made that they afford a snug but sliding fit for the alignment pins 61, presently to be described, and which pins are carried by the punch pad. These passages 44 directly overlie the slightly larger clearance passages 38 of the die support. Also, the die, as shown, is provided near its corners with clearance holes 40a for anchor screws, presently to be described, and which holes 40a, in the arrangement shown in Fig. 3, are aligned over the tapped holes 40 of the die support 35. Also, the die 42 is provided with two dowel pin holes 45. The purpose of holes 45 is to form a seat for dowel pins 39 thereby providing a definite location of die 42 on die support 35. Fig. 3 shows the die thus supported on the die support.

In Fig. 4 alignment or stock-guiding strips 46 and 47 are placed on the upper face of die 42. These strips 46 and 47 are provided with perforations 44a that are aligned with the alignment holes 44 of die 42. Also, said strip 46 is formed with dowel pin holes or seats 48 that receive the dowel pins 45a. Furthermore, said strips 46 and 47 are formed with clearance holes 49.

By reference to Fig. 5, it will be noted that a stripper plate 50 is secured on top of the strips 46 and 47. At its corners this stripper plate is formed with clearance passages 51a for cap screws 51. These cap screws 51 are passed through the clearance passages of said stripper plate, through the holes 49 of the strips 46 and 47, and through the clearance holes 40a of the die and are screwed into the tapped holes 40 of the die support. At its central portion the stripper plate 50 is provided with a punch clearance passage 52 that is aligned with but slightly larger than the passage 43 of die 42. Also, the stripper plate is formed with alignment pin clearance passages 53 that are aligned with and of approximately the same size as the clearance passages 44a of the strips 46 and 47, and hence, slightly larger than the alignment pin guiding passage 44 of the die.

In Fig. 5, the numeral 54 indicates a work stop which, however, constitutes no part of the present invention, and hence, need not be described in detail. In the assembly shown in Fig. 5, the punch or slug passage 36 of the die support, the die opening 43 of the die, and the punch clearance passage 52 of the stripper plate are of the same general form and are all placed in perfect alignment. This affords a die support that leaves only a very small portion, in no case over one thirty-second of an inch, of the die projecting over or inwards of the slug passage of the die support. Bending or distortion of the die, in action, even under very high pressure, is therefore prevented. Fig. 5 shows the fixed under structure of the die set ready for co-operative use in connection with the punch head, punch, and alignment pins which will next be described.

For the vertically movable parts, which include the punch head, punch pad, the punch, and the alignment pins, attention is particularly now called to Figs. 21, 22, 23 and 26, wherein the punch head proper is indicated by the numeral 55 and the punch pad, which forms a detachable part of the punch head, is indicated by the numeral 56. The punch pad is shown as detachably secured to the punch head 55 by countersunk cap screws 57 inserted through counterbored holes 58 formed in the corner of the punch pad. The punch 59, which corresponds to the die opening 43 of the die 42, is formed with a grooved and flanged upper end 59a, best shown in detail in Fig. 10. The grooved end of this punch is set into a correspondingly formed hole formed in the punch pad 56 and is secured therein by matrix material or metal 60 cast into the seat and into the groove of the neck of the punch, as best shown in Fig. 20. Fig. 20 shows the punch pad removed from the punch head and turned upside down and illustrates the method of inspecting clearance opening between the punch and die, subsequent to the process of securing the punch to the punch pad by means of matrix metal. This clearance is indicated by the arrows in Fig. 20. This view, Fig. 20, will be further considered later on in describing the steps of the method.

The punch pad is provided with alignment pins 61. The location and boring of the holes, in the punch pad, for these alignment pins is effected by the use of the hardened die as a drill jig, as will presently more fully appear. Also, the punch pad 56 is provided with dowel pin holes or seats 91a to receive the dowel pins 63 of Figs. 21 and 26 which have been driven into the die head 55.

The punch head 55 proper is provided with a shank or stem indicated by the numeral 64 in Fig. 23. This shank is of such size and dimensions that it will fit the recess in the ram 65 of a standard punch press, as shown in Fig. 26, by reference to which it will be further noted that the shoe is on the press bed 66 in proper working position, in respect to the punch and is secured to said bed by means of clamps 68 and screws 69. this is best illustrated in Fig. 25. Also in Fig. 25 the numeral 70 indicates a strip of metal from which blanks or slugs have been punched.

Fig. 6 is a detail showing a drill jig 71 which is the first of several drill jigs used in carrying out the improved stamping method. This drill jig is provided with two holes 72, with four holes 73, with four holes 74, and with two holes 75, which affords drill holes to be used as hereinafter described.

Fig. 7 shows a second drill jig in the form of a plate 76 that is provided with four holes 77, two holes 78 and two holes 79. This jig is further provided with a large rectangular opening 80 which represents the available working zone or area for the location of blank or slug openings in the die. This so-called second drill jig will be used in the manner explained in the description of the preferred manner of carrying out the method.

In Fig. 18 the numeral 81 indicates a heating oven, in the lower compartment of which is an oil or gas burner 82. An electric heating element may also be used for the heating of the matrix metal Y contained in a melting pot 83.

In Fig. 19, numeral 84 indicates a tray or pan on which the hardened die 42 is placed with the alignment pins 61 of the punch pad 56 in position for the proper setting of the punch in the pad. The numeral 85 indicates spacing blocks and the numeral 83 indicates the ladle or melting pot for melting and pouring the matrix metal Y into the recess between the punch and punch pad.

In Fig. 20 the numeral 87 indicates a small light bulb electrically connected to the wires of a rubber coated wire cable. It is used as a convenient means of inspecting the clearance space between the punch and the die.

In Fig. 9 the numeral 88 indicates a piece of steel or blank from which the punch 59 is to be formed, and upon which the hardened die 42 is placed and the contour of the punch is scribed or laid off from the die opening 43.

Fig. 11 illustrates the third drill jig called the punch pad drill jig. This third drill jig is made from a flat metal plate 89 having four corner holes 90 and two dowel pin locating holes 91.

In Fig. 12 the drill jig 89 is shown as placed upon the punch pad 56. The two are clamped together and the holes 90a and 91a are drilled through 90 and 91 of the jig.

The punch pad with the holes 90a and 91a drilled therein, is placed in the drill box 93 with the dowel pins 95 of the box entered in the holes 91a of the punch pad, giving it a definite location in this jig. Die 42 is now placed on this jig and punch pad and the four holes 40 are passed over the four studs 94 of the jig. The die 42 and punch pad 56 are thus clamped in a fixed relation to each other and the aperture for the upper end of the punch is scribed or marked off through the die opening 43. Also, the two holes 61a are drilled through the holes 44 in die 42. These holes are for alignment pins 61.

The die here is used for two important functions, to wit: it serves as a template from which to mark off the seat or aperture for the punch and as a drill jig for drilling the two holes 61a for the alignment pins 61. This is an important feature because here the alignment of the parts are made in the die and while the die and punch are in the process of being made and not as is the case with dies of the conventional type where the alignment is made outside of the die before it is made.

In Figs. 14 and 15 the numeral 97 indicates an enlargement of the punch passage in the punch pad, part way down. When the punch is placed in this aperture the enlarged portion of this aperture forms a recess into which matrix metal is poured thus anchoring the punch and the punch pad securely together.

In Figs. 9 and 13, a scratch-all is indicated by C.

The method

When the shoe has been made, as shown in Fig. 1, but before the holes 32 have been bored or the dowel pins 33 positioned, the drill jig 71, shown in Fig. 6, is clamped onto the shoe and the holes for the dowel pins 33 and also the holes 32, which will be tapped later, are drilled through this jig.

Next, the drill jig 71 in Fig. 6 subsequent to the making of the die support blank is now clamped onto said die support and twelve holes drilled through it into the die support, to wit: four holes 32 for cap screws 41; two holes 37 for dowel pins 33; two clear holes 38 for the aligning pins 61; and the four holes 40, which latter are to be tapped to receive the four cap screws 51. The holes 38 are to freely pass the aligning pins 61 and are slightly larger than said pins, which pins 61 will closely fit the holes 44 in the hardened die 42. The holes 32 will be tapped to receive the screws 41.

Next the drill jig 76 is placed upon the die blank 42, the two clamped together and eight holes are drilled through it into the die blank, to wit: four holes 40a, to serve as clearance passages for the four cap screws 51; two holes 44 for close sliding fit with alignment pins 61; and two holes 45 for the dowel pins 39. Also, while the jig 76 is thus clamped to the die blank, the available area into which opening or passages for punches are marked off on the die blank, through the rectangular opening 80 in the jig. After the jig is removed from the die blank, the punch passage 43 is laid off within the available zone or area and the punch passage is then formed in the die blank. It is, of course, understood that punch passages, whether of any other form than the one illustrated or of some other design, can be positioned at any angle or at any place within the available zone that will give the best relief from metal strains. After the die 42 is thus drilled and the opening or passages for punches are made, the stock alignment or stock-guiding strip 46 is placed on the die against the temporary locating pins, as shown in Fig. 16a, so that blanks or stampings may be produced in succession, as shown in Fig. 25. After stock-guiding strips 46 and 47 have been so placed on the die, they are clamped thereto and the holes in these strips are drilled through the die.

Next, the die, as just described, is heat-treated which usually causes a slight shrinkage or distortion. The hardened die is then placed on the die support and fastened to it by means of four cap screws through the four holes 40a and screwed into the four tapped holes 40 in the die support. While in this position the two holes 45' for dowel pins 39 are drilled through the die into the die support and the slug passage in the die support is marked off through the die opening, by using the tempered die as a template. The slug clearance passage 36 in the die support is made about one-thirty-second of an inch larger than the die opening 43, see Fig. 11a. The dowel pins 39 are then placed in the holes 45'. The die support is now ready to be secured onto the shoe by means of the four cap screws 41.

The die may also be used as a template to mark on the stripper, through the die opening, the passage for the punch. As the various parts, constituting the lower or die part of the die set, have been made they can be assembled as a unit and will appear as shown in Fig. 5.

The next step in the process is the fashioning or making of the punch. The die is now placed, face down, upon a block 88 and the contour of the end of the punch is marked off through the die, this is best illustrated in Fig. 9. The dies is now removed and the punch shaped or machined to an easy sliding fit through the die; sometimes a specified space or clearance between punch and die is provided and in such cases this is mostly equal to five per cent of the thickness of the material to be punched. The upper end of the punch is now grooved, as shown at 58a in Fig. 10. This grooving of the punch is for the purpose of anchoring it securely to the punch pad by means of matrix metal. It is now heat-treated after which it is ready for the punch pad.

The next step is to fabricate the punch pad for the reception of the punch Fig. 10 and the alignment pins 61. Holes are also drilled in it, two for dowel pins and four for anchoring screws 57. The process is as follows: Drill jig Fig. 11 is now placed upon the punch pad 56, as indicated in Fig. 12, the two are clamped together and six holes are drilled, two, 61a, for dowel pins and four, 60a, for anchoring screws 57. The holes are later counterbored at 58 to receive the head of screws 57. This jig is now removed and the punch pad 56 is now placed in the box drill jig 93, with the two dowel pin holes 91a over dowel pins 95. The die 42 is placed on the punch pad 56 which is already placed in jig 93 and clamped securely to the punch pad by means of the four stud and thumb nuts 94 as shown in Fig. 13.

It will be noted that the side walls of the box jig 93 are slightly lower than the thickness of the punch pad and when the die is placed upon it there is a small space between the jig and the face of the die. This clearance space is for the purpose of securing a solid clamping between the faces of the punch pad and the die. The punch pad and the die are thus clamped together in a fixed relation to each other by means of the two dowel pins 95 and the four studs and thumb nuts 94 in jig 93. While in this fixed position two holes 61a for the alignment pins are drilled in the punch pad, using the die as a jig. Also, while in this fixed position, the opening in the punch pad, which is later to receive the punch, is marked off through the die. The die and the punch pad are now removed from the jig and the aperture in the punch pad, into which the punch is to be inserted, is now made and the upper part of this aperture is to be made larger, as indicated in Figs. 14, 15, 16 and 17. The punch pad proper is now finished.

Fig. 16 shows the punch pad with the alignment pins 61 forced through the holes 61a.

In Fig. 17 is illustrated the method of aligning the punch in the die with equal clearance on all sides. It may here be stated that punches are preferably made smaller than the die opening through which they pass. This amount which the punch is smaller than the die is termed clearance and is in most cases equal to one-fifth the material which is to be punched. In detail, Fig. 17, the punch aligning process in this preferred system is as follows: the die 42 is placed upon a flat surface with working face up, the alignment pins 61 of the punch pad are now inserted in the holes 44 of the die and parallel bars of the proper width are placed between punch pad and die, as indicated in Fig. 17.

The punch is now inserted through the opening made for it in the punch pad down into the die to a depth of about one-sixteenth of an inch from the top face of the die and shim metal, paper, Cellophane or any material of thickness equal to the clearance between the punch and the die is inserted in the space between the punch and the die on four sides. This will center the punch perfectly in the die. This procedure is illustrated in Fig. 17 and the shim material is indicated by Y'.

After the die, punch and punch pad have thus been lined up, these parts are taken as a unit and placed in a heating oven such as illustrated in Fig. 18. It will be noted that it is placed in the upper compartment of the oven, the reason for that is that it will not, in this position, receive enough heat, while the metal underneath is being melted, to draw the temper of either punch or die. The purpose of heating these parts before pouring is to make a solid connection of said parts because melted metal always flows easier on heated surfaces than on cold ones. When the matrix is melted the parts are removed from the oven and placed on a nearly flat and level surface such as indicated in Fig. 18, and the matrix metal is poured into the recess between the punch and the punch pad (see Fig. 19).

When the parts have cooled enough so that they can be handled with comfort, the punch and die can be taken apart, the surplus metal, if any, can be removed from the punch pad and the punch pad placed on the punch head and secured to it by the four screws 51 as indicated in Fig. 23, and this part of the die set is now ready for action.

For the purpose of further illustration, there is added Figs. 1a to 21a, inclusive. In these additional drawings parts and elements previously described are designated by the characters previously applied; but as these drawings graphically almost make their own argument and explanation, they will now be briefly described as follows:

Shoe

The shoe 30 is preferably made from precision cold rolled steel but may be produced from other material. It is first cut to proper length, as shown in Fig 1a; the ends are then milled off to facilitate clamping, as shown in Fig. 2a; and the central hole 31 is then made in the center of the block, as shown in Fig. 3a. The purpose of the hole 31 is to let slugs and stampings pass through as they are cut from the material chosen for such parts. The six holes are then drilled, two to serve as dowel pin seats and the four holes 32, which later are to be tapped and screw-threaded, are formed as already described.

The pry slots are then milled, as shown in Fig. 5a, so that by the use of a pry bar the lower die member can be readily lifted off from the dowel pins of the shoe. The dowel pins 33 are then put in, as shown in Fig. 6a, the purpose of which dowel pins is to fix the location of the die support. The shoe is then finished as shown in Fig. 6a. In Fig. 4a a portion of the drill jig 71 is shown as applied on the shoe.

Die support

The die support is preferably made from precision cold rolled steel which is sawed off to the proper length, as shown in Fig. 7a. The drill jig 71, shown in detail in Fig. 6, is then clamped to the die support blank, as shown in Fig. 8a, and the twelve holes are drilled, four for the anchoring screws, two for dowel pin holes, four holes to be later tapped, and two clear holes for the alignment pins, which latter, as earlier noted, are somewhat greater in diameter than the alignment pins.

Fig. 9a shows the die support complete except for the formation therein of the punch passage, which latter will now be made a little larger than the punch passage in the die.

The die 42, which, as already described, has been hardened, is then clamped onto the die support by means of the four anchoring screws 51, as shown in Fig. 10a, and the two holes or seats for the dowel pins 39, which fix the location of the die on the die seat are now drilled through the holes 45 of the hardened die and the slug passage is marked off through punch passage 43 of the die, in a manner also previously described. This slug passage in the die support, as before noted, is slightly larger than the punch passage of the die, see Fig. 11a. The steps preferably employed in the formation of the die support are illustrated in Figs. 7a to 12a, inclusive, and the finished die support, with its applied dowel die aligning pins 39, is shown in Fig. 12a.

The die

The steps employed in the fabrication of the die are illustrated in Figs 13a to 17a. The die forming blank is sawed or otherwise cut from a bar of tooled steel of the right width and of such thickness that the decarbonized surface can be removed and leave it the proper thickness, see Fig. 13a. After the die has been machined, the jig 76, shown in detail in Fig. 7, and the use of which has hitherto been generally described, is clamped onto the die blank and the eight holes are drilled in it, to wit: the two holes 44 for the aligning pins 61 of the punch pad, the two holes 45 for the dowel pins 39 which serve to keep it in proper location on the die support, and the four holes 40a for the anchoring screws 51 are also drilled. The space available for the punch passage 43 of the die is then marked off through the rectangular opening of the hardened die and said punch passage 36 is then formed.

After the die blank has been drilled and the zone for the die opening marked off, as shown in Fig. 14a, a line is preferably scribed across the face of the die blank. This line is indicated in Fig. 15a and is there marked with the character L. This line is the starting point from which to lay off the die opening. One point of the lay out touches this line and this is the sarting point of the lay out. The openings on the die blank are laid in relation to each other and to this line so that the stock can be fed across the die in a straight line and parallel to the stock guide. This is illustrated in Fig. 15a. If we were to produce a stamping with a hole in it, such as illustrated in Fig. 30, we must put in another hole in the die and another punch in the punch pad. This additional hole or punch passage is illustrated in Fig. 15a by the letter P. If this hole is to be placed in the stamping to specified dimensions, it should be placed on this line on the die parallel to line L, Fig. 15a, and at such a distance from line L that when the stock is fed across the die parallel to line L this hole will be in the proper location in the stamping. Fig. 15a will make this layout clear.

The two holes M on the line L have a double function. To illustrate, if these holes were just an eighth of an inch in diameter and the temporarily inserted pins M were placed in them, as indicated in Fig. 16a, the stock guide would be placed against these pins and if clamped and drilled in that position, it will be parallel to the direction of the travel of the stock strip. It is evident that if the stock strip is placed against the guide bar as it is fed along, there will be one-sixteenth of an inch margin which is not cut off of the stock. This stock margin or scrap has a double purpose. First, it is an assurance that a full blank will be cut; and second, it holds the scrap together and assists in feeding the stock when the stampings are cut from the last end of the strip. The various steps in the production of the die can be traced graphically from the views Figs. 13a to 17a.

Stock guide

The two parts are preferable made from cold rolled steel of proper width, which is determined by the size of the stampings which the die is to produce. The thickness of these parts should be about one-sixteenth of an inch thicker than material to be punched. The stock guide 46 is placed against the locating pins M which are temporarily put into the die; and said stock guide strip 46 is then clamped to the die in this position and the holes drilled therein using the hardened die as a jig. The strip 47 is similarly clamped to the die and drilled. These operations are graphically shown in Fig. 18a.

Stripper

This stripper plate 50 is preferably made of cold rolled steel cut to the same length and width as the die; and it is then clamped to the die and the various holes drilled therein and the opening or punch passage is marked off through the opening in the die and said opening is then cut. The stock stopping device can then be mounted on the stripper plate. The various parts for the lower member of the die unit is then finished and could be assembled were it not for the fact that the die is to be used as a jig as well as a template for the fabrication of the punch and punch pad, operations previously described.

The punch pad, punch and alignment pins may be considered as a unit and is indicated as such by Fig. 27. It may be called the upper die member.

The die support, die, stock guide and stripper plate with stock stop is another unit, illustrated in Fig. 28, and is called the lower die member.

These two members may be put together and the two forms one unit which may be called a die unit, as indicated in Fig. 29. This unit can, when not in use, be stored away, and as all the parts are jig drilled, these die units are interchangeable with any set of shoes and punch heads within this range. Therefore, when some stampings are needed which this unit was made to produce, it can be mounted on any set of shoes and punch heads of this range, which may be at this time in a press. No set up or lining up in the press is necessary, simply put in the eight anchor screws and you are ready to produce stampings. Pry slots in the shoe and punch head are provided, the purpose of which is to facilitate the removal of die support from shoe and punch pad from punch head. By means of these pry slots and tool to work therein, these parts can be taken apart with the least effort and without any strain on the parts.

In the method above specifically described, the alignment pin clearance holes 38 were located and bored by the use of the jig 71 and in that operation it was necessary to make these holes 38 sufficiently larger than the alignment pin holes 44 of the hardened die so as to compensate for shrinkage in the die. As an alternative and feasible step of the process, the holes 38 could be bored by the use of the hardened die applying the drill through the alignment pin passages 44 of the hardened die; but in this modified step of the process, it would be advisable to remount and enlarge the holes 38 after they had been thus accurately located by the use of the hardened die as a jig. The use of the hardened die for locating certain holes or passages in the die support and in the punch pad is highly important and is a feature that makes possible the use in the common die set of a plurality of interchangeable dies and punches.

Advantages claimed

First, better alignment; second, interchangeable shoes; third, all parts jig drilled; fourth, the method by which alignment is attained; fifth, that the alignment is made at the time, and by the same tools as used for the drilling of alignment pin holes. The aperture in the punch pad is marked off through the die, and if such apertures are round they may be drilled directly through the die; sixth, this alignment is in the die by means of the alignment pins in the punch pad and is in direct line of where the work of the die is done; seventh, positive and permanent alignment between punch pad and die at all times; eighth, the die is used as a drill jig for drilling alignment pin holes in punch pad, for drilling screw and dowel pin holes in stock guides and stripper and for scribing or laying off aperture for punch in punch pad. Also, it is used as a drill jig for drilling dowel pin holes in die support; ninth, a permanent and positive alignment of stock guide and die by means of dowel pins in these two parts. It is important that stock guide and die are kept in a square relation to each other; and tenth, while the die opening or openings are being laid out, two small holes M are laid out and drilled in the die. These holes are in line with the progression of the stock and are placed in such a manner that if pins are put in the holes the stock guide can be placed against these pins and it will be in perfect alignment and at the same time the right distance from the die openings to allow sufficient scrap in the stock strip by which it can be carried forward.

What I claim is:

1. The method of producing a die member including a die plate and die support; which comprises first forming in the die support aligning pin clearance passages that are slightly larger than the alignment pins to be entered therein; next making a die plate with punch passages, dowel pin seats, and alignment pin passages therethrough, which latter register with, but are formed slightly smaller than, the alignment pin clearance passages of said die support; next hardening the die plate with resulting distortion; next using the hardened die plate to layout the punch passage and dowel pin seats in said die support, and finally finishing said punch passage and dowel pin seats and securing said die plate upon said die support with the punch passages and alignment pin passages in registration.

2. The method of producing die sets which involves; making a die plate with punch passage and alignment pin passages therein; hardening the die plate with resulting distortion; thereafter securing the hardened die plate to a punch pad blank and laying out the punch and the alignment pins openings in the punch pad from the die plate, separating said die plate and punch pad and supporting same in vertical spaced relation, placing a relatively thin sheet of flexible material over the upper face of the punch opening in said die plate, supporting a punch member with its upper end in the opening formed in said punch pad and its lower end wedged a short distance into the punch opening in the die plate with the sheet compressed between the punch and sides of the punch opening, and thereafter securing said punch in said punch pad.

3. The method of producing a die which involves; first making a die with punch passage, alignment pin passages, dowel pin seats anchor screw passages and spaced guide pin seats, next temporarily applying pins in said last noted seats; next locating a stock guide strip on said die, by the use of said temporary pins; next boring additional dowel pin holes through said guide strip and into said die and removing the said guide strip and temporary pins; thereafter hardening said die with resulting distortion; reapplying said temporary pins in the hardened die and reapplying said guide strip against said temporary pins, with the additional dowel pin seats of the strip and die in alignment; clamping said guide strip to said die; next using the hardened die to position and drill the alignment pin passage and the anchor screw passages in said guide strip; and finally removing said temporary pins and securing said guide strip to said die.

4. The method of producing a die set which comprises, forming a die plate with a punch passage and an alignment pin opening therein, hardening the die with resulting distortion, reproducing the passage and openings of the hardened die plate in a punch pad, enlarging the passage in said punch pad to form a punch seat, securing alignment pins in said punch pad so as to extend from the lower face thereof, supporting said punch pad and die plate in spaced relation with the alignment pins of the pad entered into the alignment openings of the die plate, placing a relatively thin sheet over the punch passage in said die plate, forcing a punch with said sheet a short distance into the passage in the die plate to center the die and passage and support the upper end of the die relative to the punch seat in said punch pad, and rigidly anchoring the upper end of the punch in the seat in the punch pad.

VITUS A. BOKER.